(12) United States Patent
Grimaux

(10) Patent No.: US 10,572,702 B2
(45) Date of Patent: Feb. 25, 2020

(54) SYSTEM AND METHOD OF RFID PORTALS

(71) Applicant: Intellitix Technologies, Inc., Montreal, Quebec (CA)

(72) Inventor: Serge Grimaux, Prague (CZ)

(73) Assignee: Intellitix Technologies, Inc., Montreal, Quebec (CA)

( * ) Notice: Subject to any disclaimer, the term of this patent is extended or adjusted under 35 U.S.C. 154(b) by 0 days.

(21) Appl. No.: 15/658,600

(22) Filed: Jul. 25, 2017

(65) Prior Publication Data

US 2018/0025193 A1 Jan. 25, 2018

Related U.S. Application Data

(60) Provisional application No. 62/366,150, filed on Jul. 25, 2016.

(51) Int. Cl.
*G06K 7/08* (2006.01)
*G06K 7/10* (2006.01)

(52) U.S. Cl.
CPC ................ *G06K 7/10425* (2013.01)

(58) Field of Classification Search
CPC .. G06F 3/1454; G06F 3/147; G06K 19/07749
USPC ............... 235/451, 380, 385, 462.46, 472.02
See application file for complete search history.

(56) References Cited

U.S. PATENT DOCUMENTS

| | | | |
|---|---|---|---|
| 9,322,974 B1* | 4/2016 | Giobbi | G06K 7/10366 |
| 9,762,581 B1* | 9/2017 | Wang | H04L 63/10 |
| 2006/0267753 A1* | 11/2006 | Hussey | A61B 5/117 340/505 |
| 2006/0278704 A1* | 12/2006 | Saunders | G06Q 20/10 235/382 |
| 2008/0198012 A1* | 8/2008 | Kamen | A61M 5/14244 340/572.1 |
| 2009/0088077 A1* | 4/2009 | Brown | H04B 5/02 455/41.2 |
| 2009/0267728 A1* | 10/2009 | Mayrand | G07C 9/00111 340/5.6 |
| 2012/0127314 A1* | 5/2012 | Clements | G08B 13/246 348/150 |
| 2015/0325091 A1* | 11/2015 | Hamilton | G07C 9/00007 340/5.53 |
| 2016/0019727 A1* | 1/2016 | Norton | G06Q 20/10 705/13 |

(Continued)

*Primary Examiner* — Daniel St Cyr
(74) *Attorney, Agent, or Firm* — White and Williams LLP (57) ABSTRACT

An RFID portal is provided for placing at an access point associated with a temporary event. The access point is controlled by a security control. The portal has a portal body erectable on at least one side of a user pathway at the access point; and an RFID reader in the portal body for reading an RFID tag issued to, and worn by, an individual user for the event that has an encoded unique UserID readable by the RFID reader. The RFID reader is located in the portal body, so as to be physically proximate to a location of the user's body where the RFID tag is worn. The RFID reader is in communication with a server which has stored a list of valid UserIDs for the event. The RFID portal also has an indicator system for receiving notification from the server that the read UserID is a valid UserID for the event and generating an indication to the security control, such that the security control permits the user to proceed along the pathway.

17 Claims, 6 Drawing Sheets

(56) References Cited

U.S. PATENT DOCUMENTS

2016/0300160 A1* 10/2016 Klein .................. G06Q 10/02
2016/0321477 A1* 11/2016 Reffe ................ G06K 7/10297
2017/0019765 A1* 1/2017 Hoyer ................ H04B 5/0075

* cited by examiner

SYSTEM AND METHOD OF RFID PORTALS

CROSS-REFERENCE TO THE RELATED APPLICATION

This application claims priority to U.S. Provisional Application Ser. No. 62/366,150, filed on Jul. 25, 2016, the contents of which are hereby incorporated by reference in its entirety.

FIELD OF INVENTION

The field of invention relates to venue control and in particular relates to access controls to manage the entrances and exits of venues for temporary events such as festivals and fairs.

BACKGROUND

Festivals and fairs especially busy ones tend to have long line ups at entrances and exits as it takes time to process visitors and to validate their tickets or other entrance credentials. Thus visitors are required to wait, rain or shine, and waste valuable time that could have been spent actually enjoying the event.

The festival industry is booming and is providing a fertile ground for vendors to showcase and offer sampling opportunities to their customer base. Such temporary events are proving to be attractive marketing campaigns for vendors looking to increase their customer base and introduce new consumers to their products by offering an opportunity to sample various items.

A festival is an event ordinarily staged by a community, centering on and celebrating some unique aspect of that community and its traditions, often marked as a local or national holiday. Festivals often serve to meet specific purposes, especially in regard to commemoration and/or celebration. A festival provides an opportunity for people to come together and celebrate while also partaking in entertainment.

A food festival is an event celebrating food or drink. A food festival usually highlights the output of producers from a certain region. Some food festivals are focused on a particular type of food item. There are also specific beverage festivals, such as the famous Oktoberfest in Germany for beer. Many cities hold festivals to celebrate wine or other produce from local producers.

A fair is a gathering of people to display or trade produce or other goods, to parade or display animals and often to enjoy associated entertainment like a circus or midway attractions. Festivals and fairs are normally temporary in nature; some last only an afternoon while others may last a few days.

Since the nature of festivals and fairs is temporary and the vendors participating in these events are generally small local vendors who have limited to no technology at their disposal; consumer information gathering at such events is not possible.

Radio-frequency identification (RFID) is the wireless non-contact use of radio-frequency electromagnetic fields to transfer data for the purposes of automatically identifying and tracking tags attached to objects. The tags contain electronically stored information. Some RFID tags are powered by and read at short ranges (a few centimeters) via electromagnetic induction. Other types of RFID tags may use a local power source such as a battery, or else have no battery but collect energy from the interrogating electromagnetic field, and then act as a passive transponder to emit microwaves or UHF (ultra high frequency) radio waves. Unlike a bar code, the RFID tag does not necessarily need to be within line of sight of the reader, and may be embedded in an object.

RFID tags can be passive or active or battery-assisted passive. A passive tag is cheaper and smaller because it has no battery. An active tag has an on-board battery and periodically transmits its ID signal. A battery-assisted passive (BAP) tag has a small battery on board and is activated when in the presence of an RFID reader.

RFID tags may either be read-only, having a factory-assigned serial number that is used as a key into a database, or may be read/write, where object-specific data can be written into the RFID tag by the system. Field programmable RFID tags may be write-once, read-multiple; "blank" RFID tags may be written with an electronic product code by the user.

Generally fixed RFID readers are set up to create a specific interrogation zone which can be tightly controlled. This allows a highly defined reading area for when tags go in and out of the interrogation zone. Mobile RFID readers may be hand-held or mounted on carts or vehicles. But all of the aforementioned prior art methods are manual and require a work force to scan the RFID tags.

Despite advances in technology, prior art methods still have several shortcomings e.g. a lack of information gathering about consumer sampling at a festival or fair. Since the duration of a festival or fair is so brief, conventional methods for setting up and collecting consumer behaviour information are not suitable or may cost too much to provide a meaningful business benefit. Thus consumer information is neither collected nor compiled in real time to be useful due to the brevity of the event. Thus a wholesale change is needed in the way brands and/or vendors and/or manufacturers (distributors, event organizers, exhibitors, etc.) engage with their audience from basic entry all the way to post event communication and data mining.

To compound this problem, consumers have steadily been moving away from cash based transactions as they don't want the hassle of carrying cash and coins, which can also be easily lost or stolen in the rush of a festival. One method to overcome this limitation is to use touchless and cashless transaction methods that provide convenience and save time. One method of achieving touchless and cashless transactions is through credit cards. Wristbands have also arisen that are embedded with RFID (Radio-frequency identification) tags and can be used as a touchless payment fob. RFID tags allow for a "tap and go" style of payment because the information is transmitted wirelessly. Two-way radio transmitter-receivers called readers send a signal to the tag and read its response. In such a transaction the user is not required to sign a piece of paper or to enter the PIN number, and neither there is any verification of signature.

Prior art methods, such as paper tickets, used at fairs, festivals, and similar events to process visitors are manual and slow. Token systems using physical items to act as a medium for exchange for goods at the event have been used but require the exchange of real currency for another physical item that must be carried around. These do not improve the guests' experience and often hinder that experience by now requiring plastic tokens or another medium to be cared for. Further, such tokens do not allow for an automated way to capture the transaction data from the event. Tokens must be exchanged in a similar way as hard currency and thus are equally slow and "dumb".

Such methods are outdated and take away from the pleasure of attending events that are brief in nature.

SUMMARY

The present invention broadly relates to a system and method of venue control using near field communications (NFC and RFID) Portals to manage the entrances and exits of temporary venues where visitors have been issued temporary RFID tags for admittance. The system and method also contemplates the use of these RFID Portals for gathering visitor behaviour information. The present invention provides a system and method of electronic touchless visitor processing for events that are temporary, short term and transient in nature (for example a wine and cheese festival held over a long weekend). Other embodiments may be adapted for permanent locations.

According to a first aspect of the invention, an RFID portal is provided for placing at an access point associated with a temporary event. The access point is controlled by a security control. The portal has a portal body erectable on at least one side of a user pathway at the access point; and an RFID reader in the portal body for reading an RFID tag issued to, and worn by, an individual user for the event that has an encoded unique UserID readable by the RFID reader. The RFID reader is located in the portal body, so as to be physically proximate to a location of the user's body where the RFID tag is worn. The RFID reader is in communication with a server which has stored a list of valid UserIDs for the event. The RFID portal also has an indicator system for receiving notification from the server that the read UserID is a valid UserID for the event and generating an indication to the security control, such that the security control permits the user to proceed along the pathway.

For example, where the RFID tag is in a bracelet or wristband format, the RFID reader may be positioned proximate to natural wrist height of the user walking by. Or, where the RFID tag is in an anklet or shoe-mounted format, the RFID reader may be positioned proximate to the user's foot or ankle height. It is a goal of the invention to make the admission process as low-impact as possible. The process of verification of the user's "ticket" is done entirely through the RFID tag issued to the user. The user does not need to stand in place and present this to a security guard or event personnel for scanning with a scan gun, but the user simply walks very naturally through the portal area with the tag being scanned on the fly.

In some embodiments the security control may be a security guard. In this case, the indicator system may include a light that visibly displays the indication to the security guard (e.g. green for go; red for stop). Alternatively, or in addition, the indicator system may include an emitter that audibly provides the indication to the security guard. In some embodiments, the security control is an automatically released barrier, gate, arm or turnstile, which is released with the indication.

Preferably, the RFID reader is capable of reading an ICODE SLI2 16693 tag or an ICODE SLI2 15693 tag.

The RFID portal may further include a portal head mounted on the portal body, which has: a first screen mounted generally away from the user; and a second screen mounted generally toward the user. The UserID may be associated with other data stored on the server. At least some of this other data may be retrieved and displayed on the first and/or second screen when the RFID tag is read. One or more messages related to the other data may also be displayed on the first and/or second screen when the RFID tag is read. For example, the other data may include: an age or date of birth credential, an access or privilege credential, and a stored funds balance.

For example, the first screen may display an access permitted decision, while the second screen displays a welcome message. The welcome message may be personalized to the user (e.g. indicating the user's name, or an id number, or particulars of the user's account, such as VIP status, or buying credits or account balance).

In some embodiments, the RFID portal may be gangable with other RFID portals at the access point, such that the user passes between two adjacent RFID portals.

The access point may be an entry point to the event, or may for example, be an entry point to a subzone within the event.

Preferably, the RFID reader is further programmed for sending a timestamp of the user's entry to the server.

The RFID portal may also optionally include an RFID writer for writing data or updated data to the RFID tag (e.g. adding or changing a funds balance associated with the RFID tag, or cancelling a single-use entry credential, so that the user cannot re-enter the event).

According to a second aspect of the invention, a self-contained RFID portal is provided for placing at an access point associated with a temporary event. The access point is controlled by a security control. The portal has a portal body erectable on at least one side of a user pathway at the access point; and an RFID reader in the portal body for reading an RFID tag issued to, and worn by, an individual user for the event that has an encoded unique UserID readable by the RFID reader. The RFID reader is located in the portal body, so as to be physically proximate to a location of the user's body where the RFID tag is worn. A processor and storage is contained within the portal body. The storage includes a locally-stored list of valid UserIDs for the event. The processor is programmed for comparing the read UserID to the list of valid UserIDs for the event. An indicator system indicates a match from the comparing step to the security control, such that the security control permits the user to proceed along the pathway.

In one embodiment each visitor is given an RFID tag that may be embedded in a wearable item e.g. a wristband or a necklace at the start of the event. Each RFID tag has a unique UserID. In one embodiment each RFID tag has a unique UserID. Optionally the RFID tag may allow funds to be preloaded to it for later use at the venue. A visitor may also be able to add a balance in advance to attending the event e.g. at the time of registration a consumer may opt to add $100 that can then be used via the RFID tag to sample or purchase different products being show cased at the event. Thus when the visitor arrives at the fair or festival and is given the RFID wristband it includes a privilege to spend $100 at the different sales booths setup at the venue.

A connected server stores the unique UserIDs of RFID tags for consumers. The connected server is preferably accessible over a network e.g. a LAN or a WAN or over the internet.

The venue is equipped with one or more RFID Portals, such as at the entrance and exit of the venue. Each RFID Portal has an RFID reader embedded in it. Signaling between the RFID reader and the RFID tag can be done in several different ways, depending on the frequency band used by the RFID tag.

The one or more RFID Portals are in communication with a connected server that stores the UserIDs of the RFID tags. The connected server may also optionally store any associated balances, age information, zone restriction/privileges information etc. The connected server is accessible over a network for example a local area network (LAN).

The RFID Portal may have two main sections the RFID Portal Head and the RFID Portal Body. The RFID Portal Head preferably has two display screens embedded at the opposite ends, e.g. LCD screens. Of the two display screens, the first screen Screen1 is used for displaying information to the visitor and the second screen Screen2 is used for displaying the information to the security personnel.

The RFID reader embedded in the Portal Body is used for reading the RFID tags worn by the visitors for controlling the access to the venue.

The RFID Portal may also incorporate one or more indicator LED lights e.g. LED lights that are used for communicating certain status information with the visitors and the security personnel. The RFID Portal in addition may also use other sensory methods e.g. auditory beeps may also be used for conveying some or part of the information to the security personnel.

The RFID Portal can be self-contained with the RFID reader, electronics for communicating with the connected server and the Portal Head with the two display screens.

Through the RFID technology festival goers are able to engage with the vendors during and after the event. The RFID Portals provide a convenient and fast visitor processing system enabling visitors to spend more time enjoying the festivities and less time waiting in lines.

The venue of a fair or a festival may be set up with one or more RFID Portals that embed RFID readers, a connected server that stores the UserIDs of the RFID tags, associated balances, age information, zone restriction/privileges information. The server is preferably accessible by the RFID Portals over a network for example a local area network (LAN).

Preferably, the RFID tags are embedded in some kind of a wearable format, e.g. a wristband, an ankle-band, a shoe-mounted format, a pair of sunglasses, a necklace, a badge, etc. Each RFID tag has a unique UserID associated with it.

Preferably, the system also allows for the collection and compilation of data using the RFID Portals. The information is gathered in real time to be useful via the RFID tags worn by visitors either in a wristband or other RFID wearable item. This entrance/exit data may also be combined with other user data collected through the RFID tags (e.g. through other transactional or sampling readers located throughout the venue), or through data provided by the user before or after the event.

Unique IDs may also be issued to each of the vendors (VendorID) participating in the event, while also providing ProductIDs for each of the products that the vendor may be offering for sampling at the event.

Real time information can then be gathered using RFID Portals, at an event level or subzone (e.g. booth). Each time a consumer enters a booth, samples or purchases one or more products and then leaves the booth, information may be gathered as to when consumer entered a booth, what products were sampled or purchased in what order they were sampled or purchased, and when the consumer left the booth.

For example when the consumer visits a booth e.g. a wine tasting tooth of a winery at a wine and cheese festival that is being held over a weekend the RFID wristband UserID may be captured and saved to the server; while VendorID is saved to the RFID wristband of the consumer. The ProductIDs of the products sampled and purchased by the said consumer at this booth are also captured and saved to the RFID wristband and the server. When the consumer leaves the wine tasting booth RFID wristband UserID is captured and saved to the server; while VendorID is saved to the RFID wristband of the consumer.

Similarly when the said consumer visits a second and a third booth the RFID UserID and timestamps are captured at arrival and departure of the consumer to these booths; and the ProductIDs of the products sampled and purchased at the second and third booth are also captured and saved to the RFID wristband and the server.

The ProductIDs may be saved to the server or the RFID wristband of the consumer. In an alternate embodiment the ProductIDs and the VendorID are saved both to the server and the RFID wristband of the consumer.

In one embodiment gathered information may be compiled about consumer's visits to different booths during an event and about the products purchased or sampled at each of the booths visited by the consumer. This information may be shared with a vendor (e.g. how many consumers visited the vendor's booth and what products were purchased and sampled). Similarly information may be shared with individual consumers about their visit to different booths and which products were purchased and sampled during the visit.

DETAILED DESCRIPTION

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. In order to provide a context for the various aspects of the disclosed invention, as well as the following discussion are intended to provide a brief, general description of a suitable environment in which the various aspects of the disclosed invention may be implemented. While the invention has been described in the general context of computer-executable instructions of a program that runs on one or more computers, those skilled in the art will recognize that the invention also may be implemented in combination with other program modules. Generally, program modules include routines, programs, components, data structures, etc. that perform particular tasks and/or implement particular abstract data types. Moreover, it will be appreciated that the present system and method may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch or other electronic gadgets incorporating the capacity to compute), microprocessor-based or programmable consumer or industrial electronics, and the like. The illustrated aspects may also be practiced in distributed computing environments where tasks/routines/processes etc. are performed by remote processing devices that are linked through a communications network e.g. a local area network (LAN) or the Internet. However, some, if not all aspects of the invention may be practiced on stand-alone computer(s). In a distributed computing environment, program modules may be located in both local and remote memory storage devices.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. Some embodiments may use well-known open-source Web development platforms using Linux, Apache, MySQL and PHP. Other examples of environments and frameworks using which computer code may also be generated are Ruby on Rails which is based on the Ruby programming language, or node.js which is an event-driven server-side JavaScript environment. In the present case, the code is specialized to execute functions described herein which enable a smoother and more efficient technological process.

Computing devices e.g. terminals or readers that enable a user to engage with the invention in general may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app or other simulation may be stored on a storage media such as a USB memory key, flash memory, or other type of memory media all collectively referred to as "removable media" in this disclosure. The app may also be downloaded from the internet. The removable media can be inserted to the console of a computing device where it is read. The console can then read program instructions stored on the removable media and present a user interface to the user. The user interface may preferably be a graphical user interface (GUI).

Figure 1:
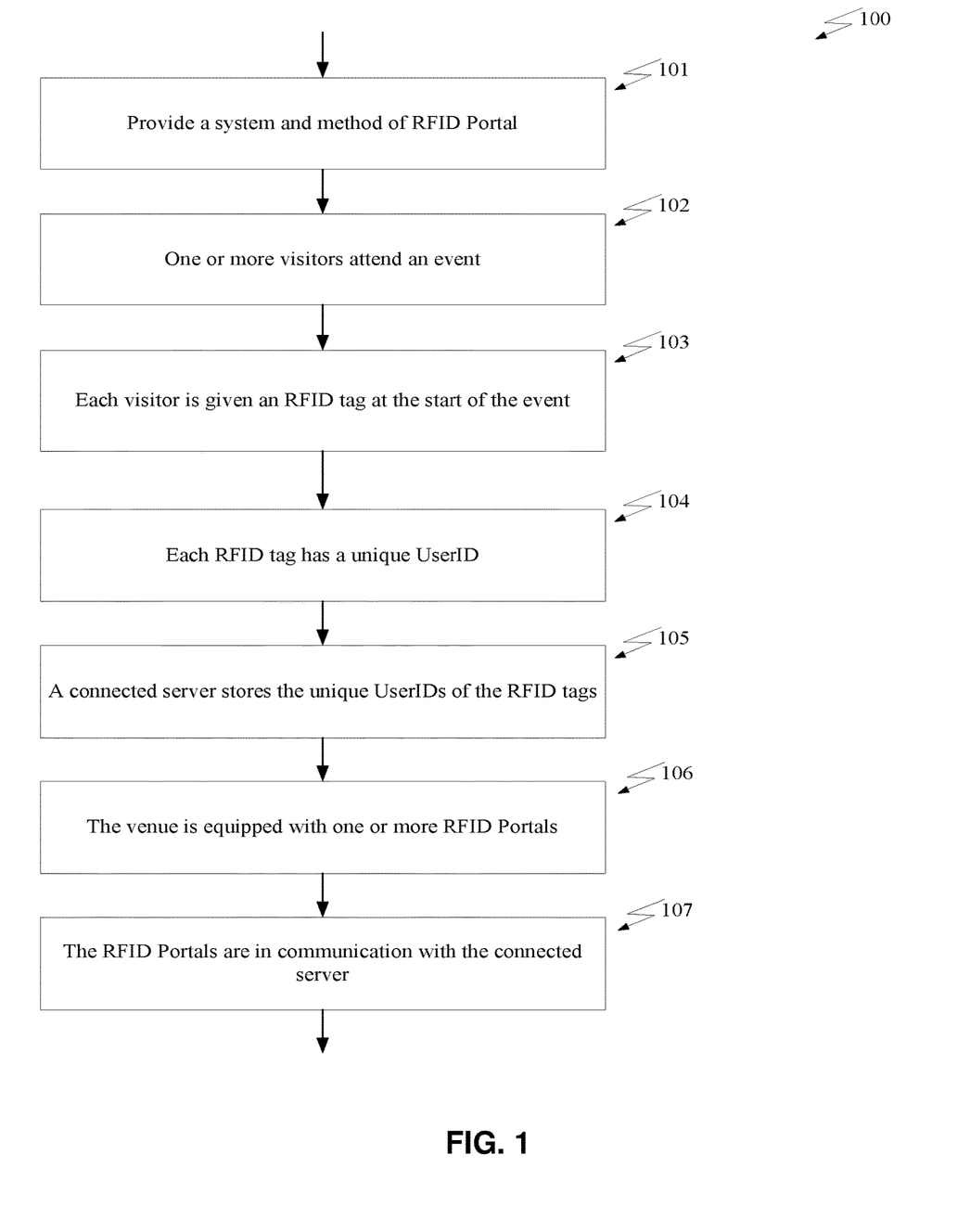
FIG. 1 is a flow diagram of a basic flow for an RFID portal enabled event.

FIG. 1 shows a preferred embodiment of the basic flow of the invention 100. A system and method is provided using RFID Portals for venue control and automatic processing of visitor admittance 101.

The present invention relates to a system and method of electronic touchless visitor processing for events that are temporary, short term and transient in nature. With or without adaptation, the system may also be suitable for permanent venues.

Some embodiments of related systems have been described in the applicant's copending U.S. patent application Ser. No. 14/717,234 (filed May 20, 2015); Ser. No. 14/946,287 (filed Nov. 19, 2015); and Ser. No. 15/048,551 (filed Feb. 19, 2016), the disclosures of which are incorporated herein by reference.

One or more visitors may attend an event 102, for example a wine and cheese festival held over a long weekend.

Each visitor is given an RFID tag at the start of the event 103. The RFID tag may be embedded in a wearable item e.g. a wristband, anklet or a necklace.

Each RFID tag has a unique UserID 104. Optionally the RFID tag may allow for funds to be loaded to it for later use at the venue. A visitor may also be able to add a balance in advance to attending the event e.g. at the time of registration a consumer may opt to add $100 that can then be used via the RFID tag to sample or purchase different products being showcased at the event. Thus when the visitor arrives at the fair or festival and is given the RFID wristband it includes a privilege to spend $100 at the different sales booths setup at the venue.

A connected server stores the unique UserIDs of RFID tags for consumers 105. The connected server is preferably accessible over a network e.g. a LAN or a WAN or over the internet.

The venue is preferably equipped with one or more RFID Portals 106, such as at the entrance and exit of a venue. Each RFID Portal has an RFID reader embedded in it. Signaling between the RFID reader and the RFID tag can be done in several different ways, depending on the frequency band used by the RFID tag. Optionally, the RFID Portal also includes a writer (not shown) that allows data to be written (or rewritten) to the tag.

The one or more RFID Portals are in communication with a connected server that stores the UserIDs of the RFID tags. The connected server may also optionally store any associated balances, age information, zone restriction/privileges information etc. The connected server is accessible over a network for example a local area network (LAN).

The unique UserIDs of RFID tags may be stored on the server in various formats and configurations. In the preferred embodiment the list of unique UserIDs of RFID tags may be available in a CSV (Comma Separated Values) format from the supplier. This CSV file is then uploaded to the server. The system then automatically initializes the RFID tags by creating a unique encryption method for that specific tag and writes the offline information to the memory of the RFID tag when the RFID tag is first read by an RFID reader in the system. In an alternative embodiment, the function of the server is replaced by a self-contained system in the RFID portal, which includes at least a processor and local storage containing the list of valid UserIDs.

In one embodiment of the invention the system may use standardized RFID tags (ICODE SLI2 15693 on 13.56 MHz (HF)), the most common tag type for inventory tracking.

RFID tags contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory.

The RFID tag includes either a chip-wired logic or a programmed or programmable data processor for processing the transmission and sensor data, respectively.

Such RFID tags have a memory which has two sectors: the ROM (read only memory) and the R/W (read/write) memory. The ROM stores the UserID (also known as UID) of the RFID tag. This information is burnt to the ROM at the time of manufacturing and cannot be changed later. The second sector of the memory is a R/W memory, where transactional information is stored e.g. information such as balance, one or more previous transactions, zone restrictions, age limit, etc. Such information may be preferably stored in an encrypted format. The preceding list of items stored on the RFID tag is exemplary and the invention is not limited to these examples.

An RFID reader transmits an encoded radio signal to interrogate the RFID tag. The RFID tag receives the message and then responds with its identification and other information. This may be only a unique tag serial number, or may include product-related information such as a stock number, lot or batch number, production date, or other specific information. In case of the double tap payment method, the balance is written to the RFID tag in addition to some other information like balance, age limit and zone restrictions etc.

When written into the RFID tag by an RFID printer, the tag contains a 96-bit string of data. The first eight bits are a header which identifies the version of the protocol. The next 28 bits identify the organization that manages the data for this tag; the organization number is assigned by the EPC-Global consortium. The next 24 bits are an object class, identifying the kind of product; the last 36 bits are a unique serial number for a particular tag. These last two fields are set by the organization that issued the RFID tag. Similar to a URL, the total electronic product code number can be used as a key into a global database to uniquely identify a particular product.

Generally, the read range of an RFID tag is limited to the distance from the reader over which the tag can draw enough energy from the RFID reader field to power the tag. RFID tags may be read at longer ranges than they are designed for by increasing reader power.

In one embodiment the use of RFID Portals prevents visitors from fraudulently entering any areas that are restricted.

Figure 2:
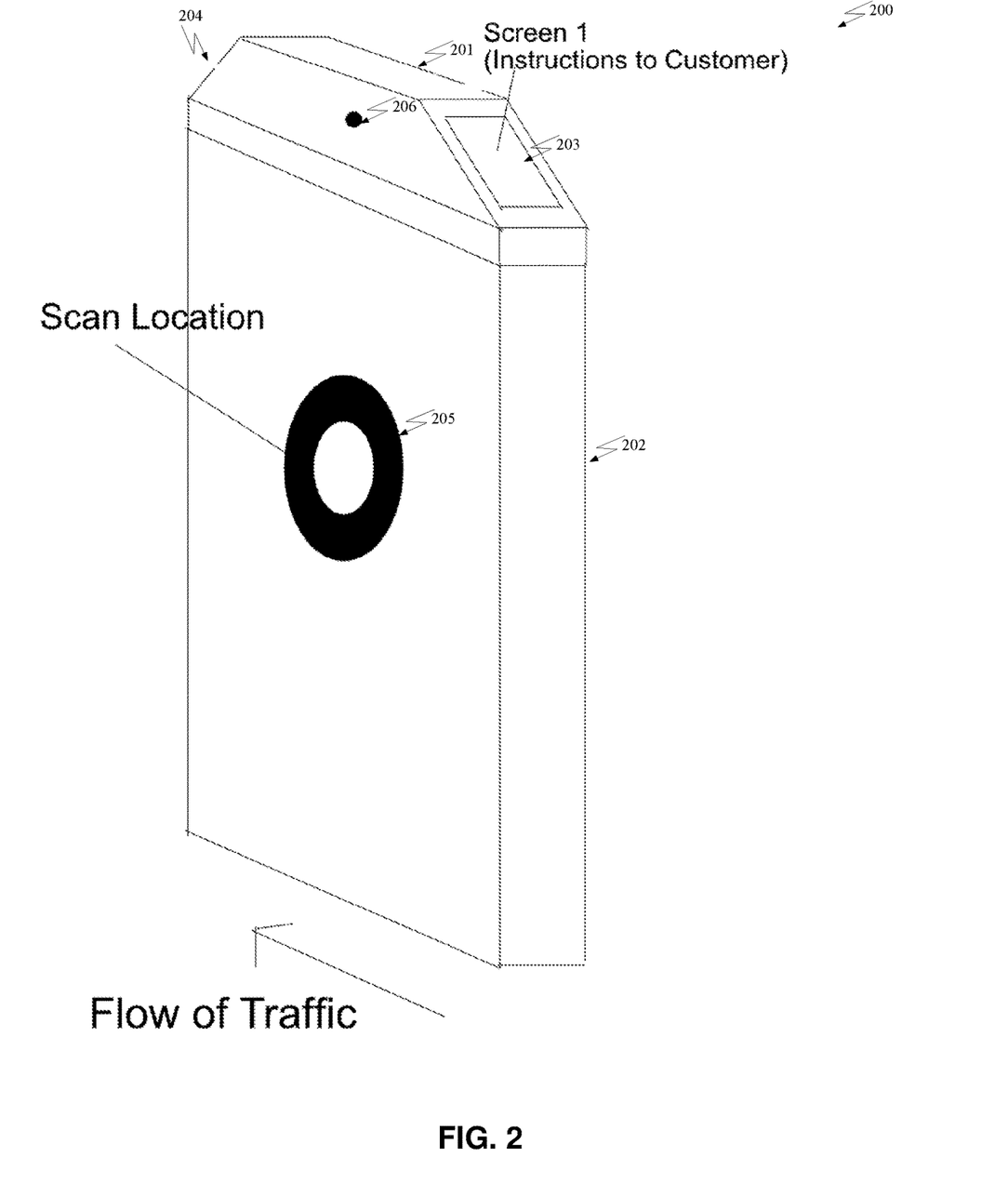
FIG. 2 is a first side (user-facing) view of an RFID portal.

FIG. 2 shows a preferred embodiment of the RFID Portal 200. The RFID Portal has two main sections the RFID Portal Head 201 and the RFID Portal Body 202.

In the preferred embodiment the RFID Portal Head 201 preferably has two display screens embedded at the opposite ends. Each RFID Portal incorporates two or more display screens e.g. LCD screens. Of the two display screens, the first screen Screen1 203 is used for displaying information to the visitor and the second screen Screen2 204 is used for displaying the information to the security personnel.

In the preferred embodiment the RFID Portal Body 202 has an RFID Reader 205 embedded in it. The RFID reader is used for reading the RFID tags worn by the visitors for controlling the access to the venue. The RFID reader is preferably located at a height so as to be near where the tag is worn on the user's body. In the example shown, the RFID tag might be contained in a wristband or bracelet, and the RFID reader is preferably at approximately natural wrist height for an average visitor. Because of this positioning of the RFID reader, the user/visitor does not need to adopt any specific physical position for the tag to be read (e.g. raise arm to "show" the tag to a security personnel or scanning gun), but can simply walk through the portal naturally.

Each RFID Portal incorporates an RFID reader. Signaling between the RFID Reader 205 and the RFID tag can be done in several different ways, depending on the frequency band used by the RFID tag. RFID tags operating on LF (Low Frequency) and HF (High Frequency) bands are, in terms of radio wavelength, very close to the reader antenna because they are only a small percentage of a wavelength away. An RFID tag is electrically coupled with the transmitter in the reader. The RFID tag can modulate the field produced by the reader by changing the electrical loading the tag represents. By switching between lower and higher relative loads, the RFID tag produces a change that the RFID reader can detect. At UHF (Ultra High Frequency) and higher frequencies, the RFID tag is more than one radio wavelength away from the reader, requiring a different approach.

The RFID Portal may also incorporate one or more indicator LED lights e.g. LED light 206 that is used for communicating certain status information with the visitors. The RFID Portal in addition may also preferably use other sensory methods e.g. auditory beeps may also be used for conveying some or part of the information to the visitors and the security personnel.

The RFID Portal can be self-contained with the RFID reader, electronics for communicating with the connected server and the Portal Head with the two displays screens. Further, the UserIDs can be locally stored in the RFID Portal and compared locally using an onboard processor. Other functions may also be programmed locally and other kinds of data stored locally (e.g. timestamp collection of user visits).

In one embodiment the RFID Portals control the entrance and the exit to a given venue by allowing entrance or denying entrance based on the validity of the RFID tags embedded in wearable items like a wristband.

Figure 3:
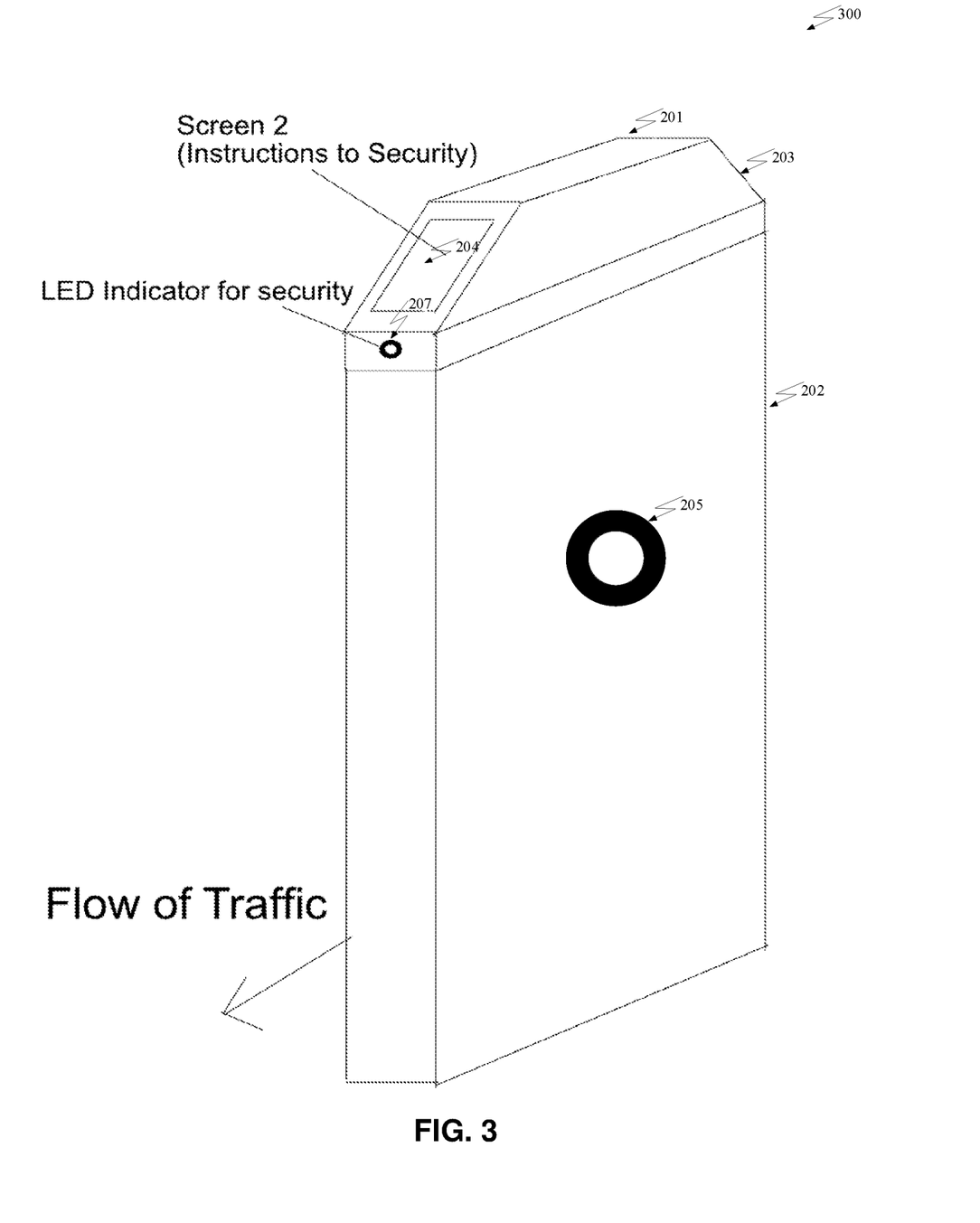
FIG. 3 is a second side (security-facing) view of an RFID portal.

FIG. 3 shows a second embodiment (or at least a separate perspective) of the RFID portal 300. The RFID Portal has two main sections the RFID Portal Head 201 and the RFID Portal Body 202. In the preferred embodiment the RFID Portal Head 201 preferably has two display screens embedded at the opposite ends. Each RFID Portal incorporates two or more display screens e.g. LCD screens. Of the two display screens, the first screen Screen1 203 is used for displaying information to the visitor and the second screen Screen2 204 is used for displaying the information to the security personnel.

An indicator LED light 207 may be used for communicating certain status information with the security personnel. Other embodiments may employ LED lights and other sensory methods for conveying information to the security personnel e.g. auditory beeps may also be used for conveying some or part of the information to the security personnel e.g. two short beeps could be used for valid access while a longer louder beep may be used for an invalid access. The auditory beeps may also preferably be accompanied with LEDs e.g. lighting one or more green LEDs implies a valid access while lighting one or more flashing red LEDs implies an invalid access.

Figure 4:
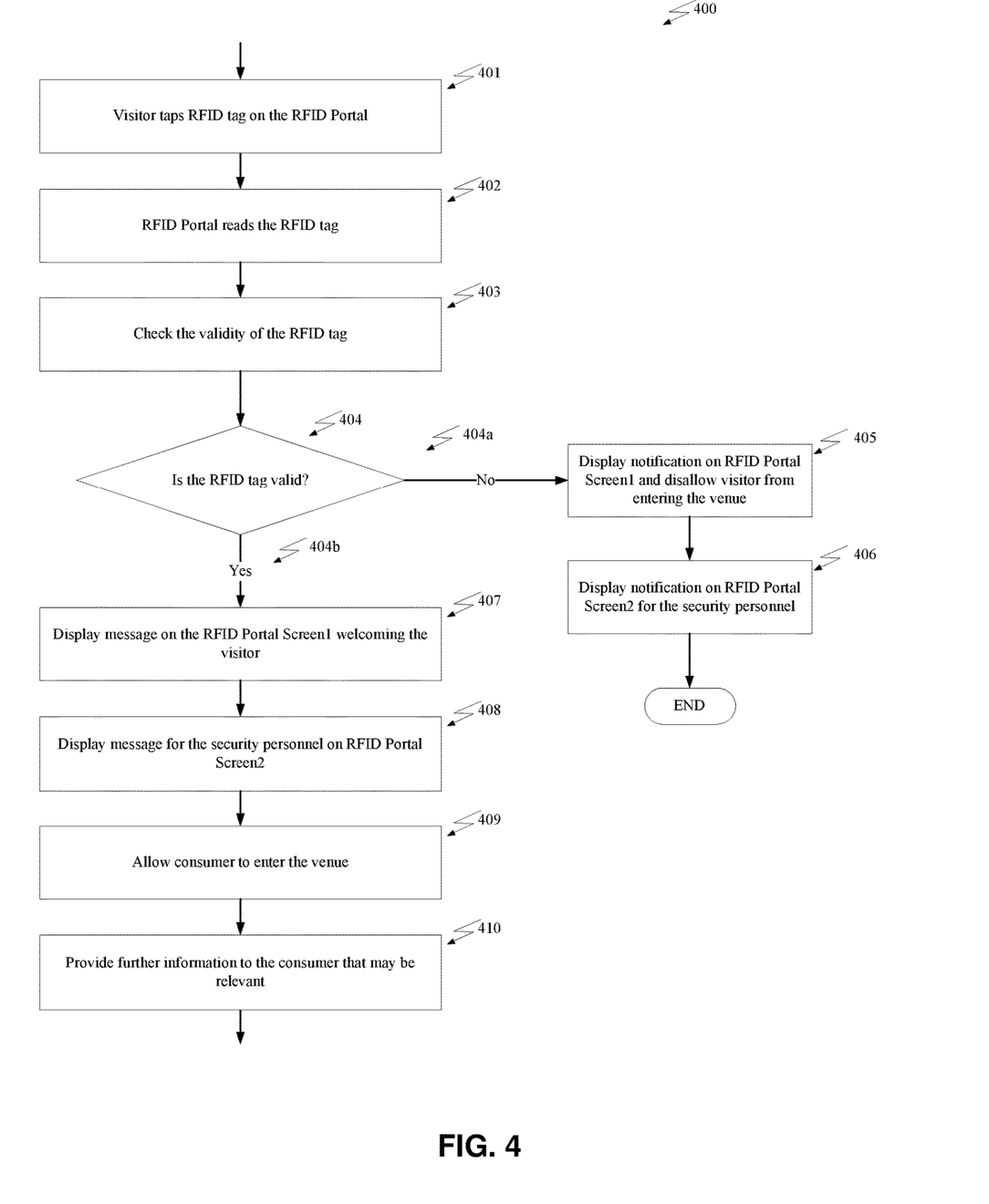
FIG. 4 is a flow diagram of a sample processing flow for RFID portal.

FIG. 4 shows one embodiment of the process 400. The visitor taps the RFID tag on the RFID Portal or simply walks past the RFID Portal such that the RFID tag is read by the reader 401.

In popular events, at peak times, lines can be long, and having to show a card or other access control credential takes time. In the present system, by allowing the user to just walk past the RFID Portal, the RFID tag in the wearable item can be automatically read and the information displayed to the consumer and the security personnel in two different and separate screens. As the verification of the UserID is done substantially in real time, the user's progress (and progress of the line through the entrance) is not impeded.

The RFID Portal reads the RFID tag 402.

The system checks the validity of the RFID tag 403. The validity of the RFID tag can be checked by reading its UserID and passing this UserID to the server for validation. The server may preferably have a database or a list of all valid UserIDs for the RFIDs that are related to an event, the associated balances, a list of recent transactions, age and zone restrictions if any amongst other information about the bearer of the RFID tag.

The system checks whether the RFID tag valid 404. If the UserID of the RFID tag is not valid 404*a* then the user/visitor is disallowed from entering the venue. A notification may be displayed on RFID Portal Screen1 for the visitor as the visitor is disallowed from entering the venue 405. Preferably information is also displayed for the visitor noting the reason that they are not allowed to enter e.g. access is denied due to an expired ticket, or due to an age restriction.

The system may also display a notification on RFID Portal Screen2 for the security personnel 406. In certain embodiments a security person may also be manning the entrance or exit of a venue. In other embodiments the RFID Portal may be fully automated (e.g. with a turnstile gate) allowing or disallowing entrance to the venue.

If the UserID of the RFID tag is valid 404*b*, then the system allows the visitor to enter the venue. Thus only if the UserID of the RFID tag matches with a valid UserID in the list/database on the server then it is considered that the RFID tag is valid. Alternatively, in some embodiments, rather than a "white list" (valid UserIDs) approach, a "black list" approach may be used (i.e. checking for specific banned persons instead).

On verification, a message may be displayed on the RFID Portal Screen1 welcoming the visitor 407. Further, a message may be displayed for the security personnel on RFID Portal Screen2 408. At this point, the visitor may be allowed to enter the venue 409. Further information relevant to the visitor may also be provided 410.

Figure 5:
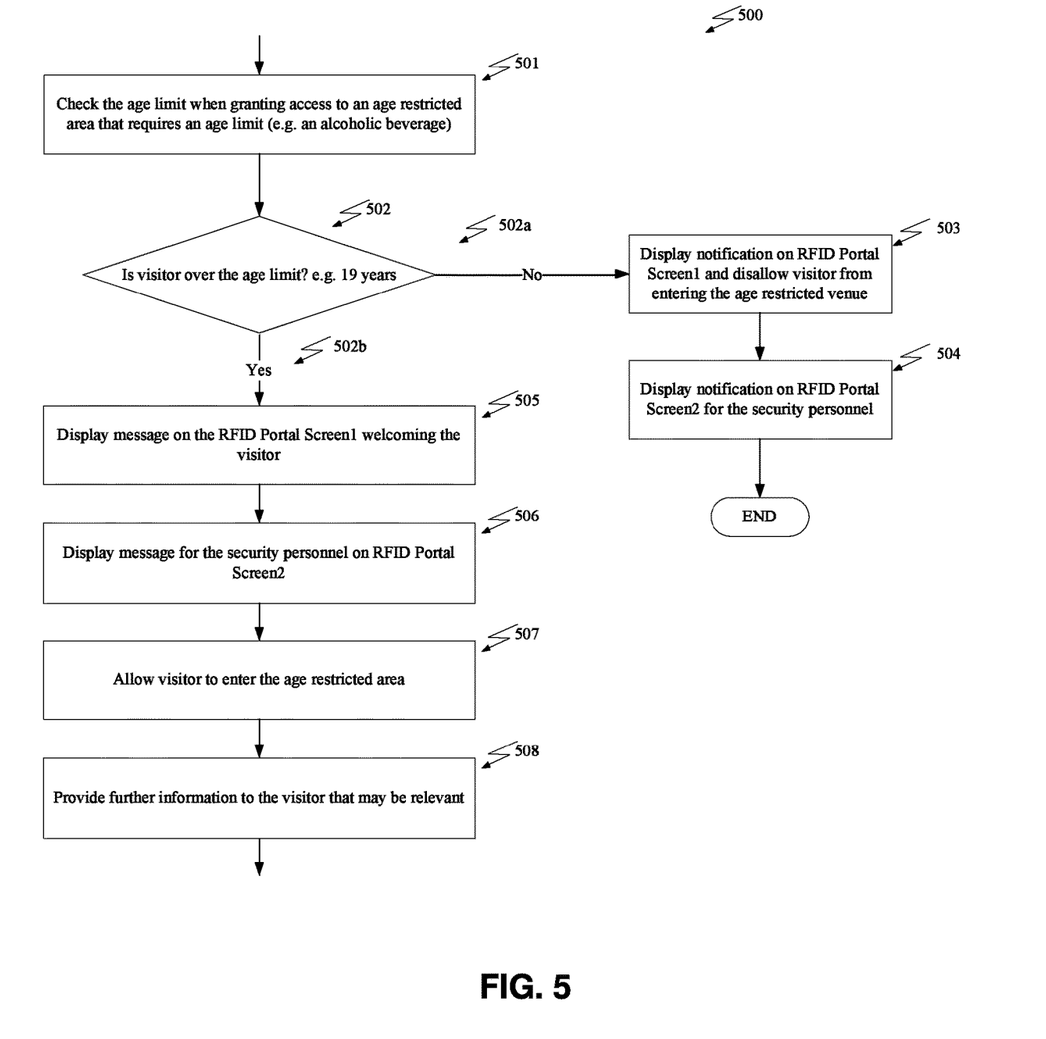
FIG. 5 is a flow diagram of credential verification (here, in an age restricted zone).

FIG. 5 shows one embodiment of the process flow, specific to age verification 500. The system preferably checks the age limit when granting access to an age restricted area that requires an age limit (e.g. an alcoholic beverage) 501. Certain events e.g. a festival may be divided into one or more zones. The different zones in a festival may be required in order to segregate the visitors based on their age or their payment levels. For example a fair may have an area where alcoholic beverages can be sampled or purchased, that is only accessible to persons aged 19 or over and any products/services being vended in this zone may only be sampled/purchased by these people.

For example an event like a fair may have products or services for sale or sampling that are age restricted e.g. alcohol or products aimed at an adult audience. Thus it is important to check the age of a visitor to such an area to ensure that age restricted products and services are only offered to the legal audience.

The system checks whether the visitor is over the age limit, e.g. 19 years 502. The RFID Portal reads the RFID UserID and communicates the RFID UserID with the connected server.

The server may store this information so that when an RFID tag is read by an RFID Portal it can verify the age restrictions, zone restrictions/privileges by connecting to the server and querying the UserID of the RFID tag and checking its bearer's restrictions/privileges before allowing the visitor to enter such an area. Alternatively the RFID tag may preferably contain this information that defines the zone(s) where the RFID tag is valid.

If the age of the person associated with the UserID is not valid for the age restricted area 502*a* the system preferably displays a notification on RFID Portal Screen1 and disallows the visitor from entering the age restricted venue 503.

The system also preferably displays a notification on the RFID Portal Screen2 for the security personnel 504.

If the owner of the RFID UserID is valid for the age restricted area 502*b* a message may be displayed on the RFID Portal Screen1 welcoming the visitor 505.

A message may also be displayed for the security personnel on RFID Portal Screen2 506 preferably indicating that the visitor is of appropriate age. The system allows the visitor to enter the age restricted area 507 e.g.

Further information may be provided to the visitor that may be relevant 508, and a sales person may be allowed to vend age-restricted products to the visitor.

The server may preferably store the age or date of birth information about the consumer, so that when an RFID tag is read by the RFID Portal the age can be verified before allowing a visitor to enter the age restricted area.

In another embodiment the RFID tag may preferably contain the age or date of birth information about the visitor. Alternatively the RFID tag and the server both may store the age and date of birth information about the visitor.

Figure 6:
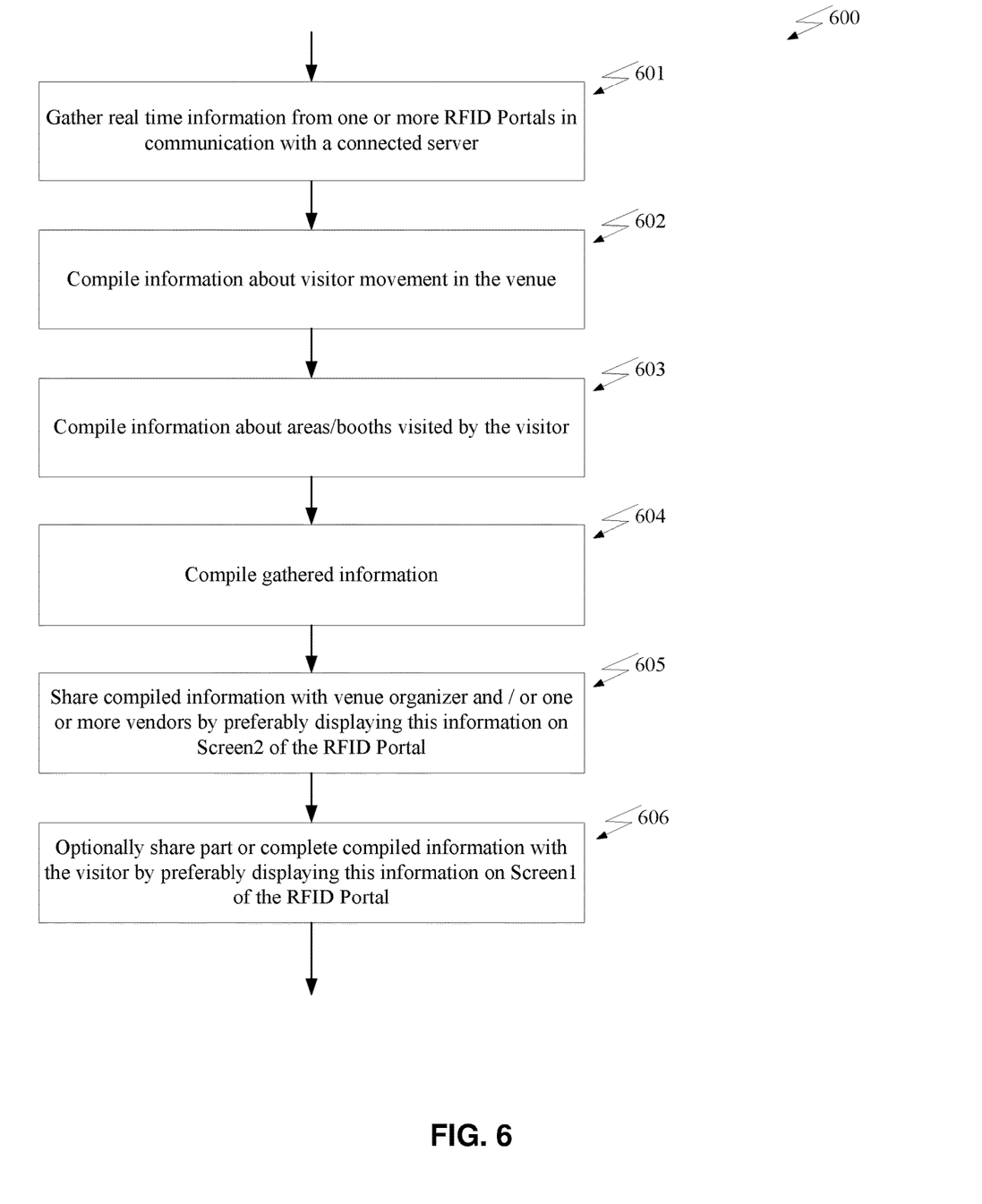
FIG. 6 is a flow diagram of data compilation using a system of RFID portals.

FIG. 6 shows one embodiment of the flow, related to data compilation 600. Real time information is preferably gathered from one or more RFID Portals in communication with a connected server 601. The RFID Portals may be strategically placed in different areas of a venue and read the RFID tags worn by the visitors. For example the RFID Portals may read the RFID tag of a visitor each time said visitor enters an area or booth, samples or purchases one or more products and then leaves the booth. Information may be gathered as to when a particular visitor entered an area or booth, what products were sampled or purchased in what order they were sampled or purchased, and when did the visitor leave the booth. This may be done using the portals themselves, or the portals may be part of a broader network of RFID readers/terminals throughout an event area/venue.

Preferably, the RFID Portal captures the visitor RFID UserID and timestamp at entry and then at the exit of a vendor booth. The captured visitor RFID UserID and timestamp are saved to the server or the RFID tag or both. In one embodiment this information may be first saved to the RFID tag in realtime, but may be uploaded to the server asynchronously. In an alternate embodiment this information is saved to both the RFID tag and the connected server in realtime.

The system may compile information about visitor movement in the venue 602. For example a consumer visits a wine and cheese festival and during the visit goes to a cheese outlet booth, then goes to the winery booth and then goes to the beer booth.

The system may compile information about areas/booths visited by the visitor 603.

For example at a wine and cheese festival, a consumer visits a cheese outlet booth and tries a cream cheese and an aged cheddar cheese; then goes to a winery booth and tries a red wine and a white wine; and subsequently at lunch visits the beer booth and samples different types of beers. A full timestamped log of an individual consumer's activity during a festival may be gathered.

The gathered information may then be compiled 604.

This compiled information may be shared with the venue organizer and one or more vendors in several ways. For example, basic history or log data for the user may displayed on Screen2 of the RFID Portal 605.

The information about all visitors who visited the booth of a particular vendor may include but is not limited to the following:
  What was the peak time at the booth in terms of traffic
  What was the slow time at the booth in terms of traffic
  When most sales were conducted
  When least sales were conducted
  Average time consumers spent in the area or booth (by capturing entry time and departure time)
  Average visitor spending at the vendor
  In what sequence visitors visited (which area/booth was visited first, which area/booth was visited last etc.)
  Which products were sampled most
  Which products were purchased most
  Which products were sampled least
  Which products were purchased least The information about a particular visitor who visited the booth of a particular vendor may include but is not limited to the following:
  When did the visitor visit the area/booth
  Was the visit during peak time or during slow time
  How much time did this visitor spend and how it compares to the average time for all visitors who visited this area/booth
  How much did this visitor spend and how it compares with the average visitor spending at this vendor
  In what sequence did this visitor visit the vendor area/booth
  Which products were sampled
  Which products were purchased
  Ratio of sampled products to purchased products Alternatively compiled information may also be sent to the vendor via an attached file in an e-mail, mailing printed results, a link to the compiled information that is accessible over the internet, and other electronic methods conducive to sharing and sending information over the internet, e.g. after the event is over or at the end of the day for a multi-day event or at given intervals during an event.

Optionally part or complete compiled information may be shared with the visitor. This may be displayed for example on Screen1 of the RFID Portal 606.

Alternatively this information may be shared with the visitor after the visit is complete e.g. via an attached file in an e-mail, mailing printed results, a link to the compiled information that is accessible over the internet, and other electronic methods conducive to sharing and sending information over the internet.

In one embodiment the information about a particular visitor who visited the event e.g. the festival or fair may include but is not limited to the following:
  How many booths did the visitor visit
  In what order did the visitor visit the area/booths
  Time spent at each of the area/booths
  Which products were sampled and or purchased at each area/booth visited
  How much did the visitor spend in total at the event
  How much did the visitor spend at each area/booth
  What products were purchased/sampled by the visitor
  What products were most popular at the event
  In what sequence products were sampled at a given area/booth
  Comparison of visitor time spent at the area/booth with the average time of all visitors at the same booth
  Comparison of visitor spending at the area/booth with the average spending of all visitors at the same booth In one embodiment the RFID Portal captures the RFID tag UserID and timestamp at arrival and departure of the visitor to a given vendor booth.

In the preferred embodiment the RFID tag UserID and the VendorID may be captured and stored on the server at the time of entry and at the time of departure. In other alternate embodiments other combinations of VendorIDs and RFID UserIDs may be read at the RFID Portal as the visitor walks past it, and is stored on the RFID tag, the connected server, the sales terminal, the top-up terminal or other such storage device or mechanism.

Thus by tracking the RFID tag UserID of a particular visitor over a period of time when attending a fair or a festival, along with the VendorIDs of the booths visited and the ProductIDs of the products purchased or sampled a complete visitor profile can be assembled that reflects the visitor's purchasing and sampling preferences during that visit.

The above are exemplary and not limiting, in fact the intent is to cover all such information that may be relevant and gathered at an event and shared with the vendors or consumers attending the event.

In one embodiment of the invention the RFID tags are customized before usage. In an alternate embodiment of the invention the system and method of the invention may use generic RFID tag for example RFID tags having an ICODE SLI2 15693.

One embodiment of the invention may use Active Reader Passive Tag (ARPT) system that has an active reader, which transmits interrogator signals and also receives authentication replies from passive RFID tags.

These descriptions exemplify only some of the several possible embodiments of the invention and are not meant to be exhaustive. The intent is to cover all practical possibilities and combinations.

It should be understood that although the term application has been used as an example in this disclosure but in essence the term may also imply to any other piece of software code where the embodiments of the invention are incorporated. The software application can be implemented in a stand-alone configuration or in combination with other software programs and is not limited to any particular operating system or programming paradigm described here.

The computer program comprises: a computer usable medium having computer usable program code, the computer usable program code comprises: computer usable program code for presenting graphically to the users options for scrolling via the touch-screen interface.

The examples noted here are only for illustrative purposes and there may be further implementation embodiments possible with a different set of components. While several embodiments are described, there is no intent to limit the disclosure to the embodiment or embodiments disclosed herein.

All aspects are illustrative and not restrictive and may be embodied in other forms without departing from their spirit and essential characteristics.

What is claimed is:

1. An RFID portal for placing at an access point associated with a temporary event, the access point being controlled by a security control, the portal comprising:
    a portal body erectable on at least one side of a user pathway at the access point;
    an ISO 15693 RFID reader in the portal body for reading an RFID tag issued to, and worn by, an individual user for the event in the specific form of (i) a bracelet or wristband; or (ii) an anklet or shoe-mounted format that has an encoded unique UserID readable by the RFID reader, the RFID reader being located in a side portion of the portal body physically proximate to natural wrist height for bracelet or wristband tags; or at foot or ankle height for anklet or shoe-mounted tags, such that the user in no case needs to raise the tag over the portal for reading;
    the RFID reader being in communication with a server which has stored a list of valid UserIDs for the event;
    an indicator system for receiving notification from the server that the read UserID is a valid UserID for the event and generating an indication to the security control, such that the security control permits the user to proceed along the pathway; and
    a portal head mounted on an upper portion of the portal body, and having:
        a first screen mounted generally away from the user; and
        a second screen mounted generally toward the user.

2. The RFID portal of claim 1, wherein the security control is a security guard.

3. The RFID portal of claim 2, wherein the indicator system includes a light that visibly displays the indication to the security guard.

4. The RFID portal of claim 2, wherein the indicator system includes an emitter that audibly provides the indication to the security guard.

5. The RFID portal of claim 1, wherein the security control is an automatically released barrier, gate, arm or turnstile, which is released with the indication.

6. The RFID portal of claim 1, wherein the UserID is associated with other data stored on the server.

7. The RFID portal of claim 6, wherein at least some of the other data is retrieved and displayed on the first and/or second screen when the RFID tag is read.

8. The RFID portal of claim 6, wherein a message related to the other data is displayed on the first and/or second screen when the RFID tag is read.

9. The RFID portal of claim 6, wherein the other data includes at least one of: an age or date of birth credential, an access or privilege credential, and a stored funds balance.

10. The RFID portal of claim 1, wherein the first screen displays an access permitted decision, and the second screen displays a welcome message.

11. The RFID portal of claim 10, wherein the welcome message is personalized to the user.

12. The RFID portal of claim 1, wherein the RFID portal is gangable with other RFID portals at the access point, such that the user passes between two adjacent RFID portals.

13. The RFID portal of claim 1, wherein the access point is an entry point to the event.

14. The RFID portal of claim 1, wherein the access point is an entry point to a subzone within the event.

15. The RFID portal of claim 1, wherein the RFID reader is further programmed for sending a timestamp of the user's entry to the server.

16. The RFID portal of claim 1, further comprising an RFID writer for writing data or updated data to the RFID tag.

17. A self-contained RFID portal for placing at an access point associated with a temporary event, the access point being controlled by a security control, the portal comprising:
    a portal body erectable on at least one side of a user pathway at the access point;
    an ISO 15693 RFID reader in the portal body for reading an RFID tag issued to, and worn by, an individual user for the event in the specific form of (i) a bracelet or wristband; or (ii) an anklet or shoe-mounted format that has an encoded unique UserID readable by the RFID reader, the RFID reader being located in a side portion of the portal body physically proximate to natural wrist height for bracelet or wristband tags; or at foot or ankle height for anklet or shoe-mounted tags, such that the user in no case needs to raise the tag over the portal for reading;
    a processor and storage contained within the portal body, the storage including a locally-stored list of valid UserIDs for the event, the processor being programmed for comparing the read UserID to the list of valid UserIDs for the event;
    an indicator system for indicating a match from the comparing step to the security control, such that the security control permits the user to proceed along the pathway; and
    a portal head mounted on an upper portion of the portal body, and having:
        a first screen mounted generally away from the user; and
        a second screen mounted generally toward the user.

* * * * *